Figure 1:
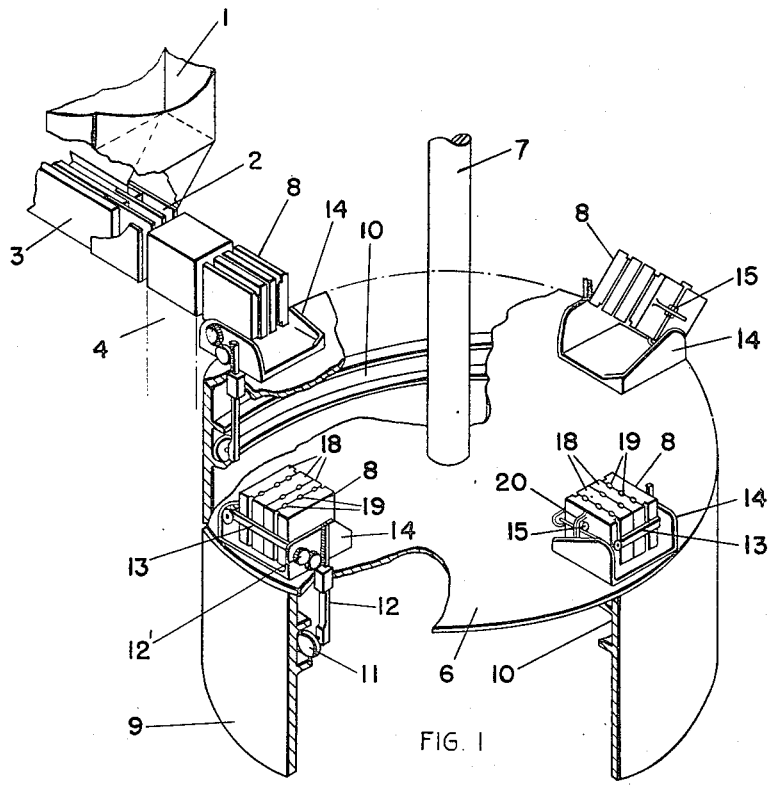

Jan. 26, 1954   D. G. ASHCROFT ET AL   2,667,101
APPARATUS ADAPTED FOR RECEIVING AND EVENTUALLY
DISCHARGING CYLINDRICAL WRAPPERS
Filed June 5, 1950   5 Sheets-Sheet 1

Inventors
DONALD GEORGE ASHCROFT
THOMAS PITCAIRN

Cushman, Darby & Cushman
Attorneys

Inventors
DONALD GEORGE ASHCROFT
THOMAS PITCAIRN

Cushman, Darby & Cushman
Attorneys

Jan. 26, 1954     D. G. ASHCROFT ET AL     2,667,101
APPARATUS ADAPTED FOR RECEIVING AND EVENTUALLY
DISCHARGING CYLINDRICAL WRAPPERS
Filed June 5, 1950     5 Sheets-Sheet 4

Inventors
DONALD GEORGE ASHCROFT
THOMAS PITCAIRN

Cushman, Darby & Cushman
Attorneys

Inventors
DONALD GEORGE ASHCROFT
THOMAS PITCAIRN

Cushman, Darby & Cushman
Attorneys

Patented Jan. 26, 1954

2,667,101

UNITED STATES PATENT OFFICE 2,667,101

APPARATUS ADAPTED FOR RECEIVING AND EVENTUALLY DISCHARGING CYLINDRICAL WRAPPERS

Donald G. Ashcroft, Saltcoats, and Thomas Pitcairn, West Kilbride, Scotland, assignors to Imperial Chemical Industries Limited, a corporation of Great Britain Application June 5, 1950, Serial No. 166,166

Claims priority, application Great Britain July 15, 1949

3 Claims. (Cl. 86—46)

The present invention relates to apparatus particularly adapted for receiving and eventually discharging cylindrical wrappers comprising in association a spreader box and a rotatable table having a plurality of compartmented shuttles equally spaced on said table and wherein the compartments are closed at one end, said spreader box and shuttles being adapted to receive and discharge cylindrical wrappers, and said table being capable of intermittent rotation so as to bring each shuttle in turn to rest when in a position to receive cylindrical wrappers from the spreader box.

The object of the present invention is to provide apparatus of the aforesaid kind in which the intermittent rotation of the rotatable table mechanically induces any one compartmented shuttle to go through at least two predetermined stationary positions so that in one position the compartments of said shuttle are in the receiving position for the cylindrical wrappers, and in at least one other position the compartments are vertical with their closed ends below their open ends and through a region after the last position in which the compartments are vertical and before the first mentioned position in which the compartments are in the receiving position wherein the compartments make an angle with the horizontal so that their open ends point downwards.

According to the present invention apparatus particularly adapted for receiving and eventually discharging cylindrical wrappers comprises in association a spreader box and a rotatable table having a plurality of shuttles equally spaced thereon, said table being capable of intermittent rotation so as to bring each shuttle in turn to rest when in alignment with the spreader box, the said spreader box being fixed in position and having substantially horizontal passages to align the cylindrical wrappers for entry into each of the said shuttles when rotated into a fixed receiving position by the rotation of said rotatable table, each shuttle being mechanically rotatable about a horizontal axle which when said shuttle is in the receiving position is substantially normal to the path of travel of said cylindrical wrappers and each shuttle having suitable spaced compartments closed at one end which compartments are in alignment with the substantially horizontal passages of the spreader box and their open ends face the spreader box when the shuttle is in the receiving position.

Preferably each shuttle has means for converting linear motion into angular motion, the linear moving portion of said means having a follower engaging a fixed circular cam track which has a configuration to produce such linear motion of the said follower as to produce the desired rotation of the shuttle about said horizontal axle as the rotatable table is caused to rotate.

Furthermore it is desirable that the compartments in each shuttle are formed from a series of leaves grooved at their meeting faces to form the said compartments, said compartments being widened and brought back to normal by the movement of the leaves which movement is effected by a cam rotated by the movement of the shuttle about its horizontal axle, said compartments being in the wider condition when the shuttle is in the receiving position, in the normal condition as said shuttle rotates from said receiving position into a position wherein the compartments are vertical with their open ends facing upwards, and again in the wider condition when the shuttle is in a position for the discharge of said cylindrical wrappers.

Preferably the apparatus according to the invention is in association with horizontal pusher-slats arranged to feed forward a predetermined number of pre-arranged vertical rows of cylindrical wrappers into said spreader box and from said spreader box into the compartments of a shuttle when in the receiving position.

Figure 6:
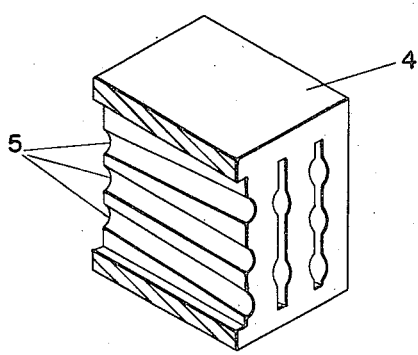
Figure 2:
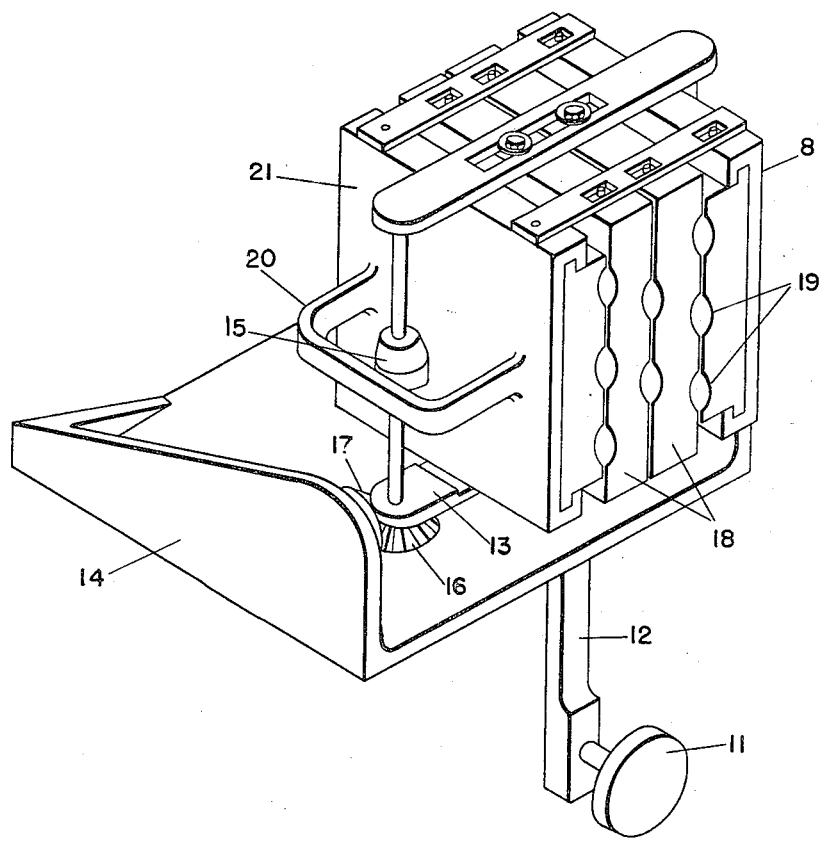
Figure 3:
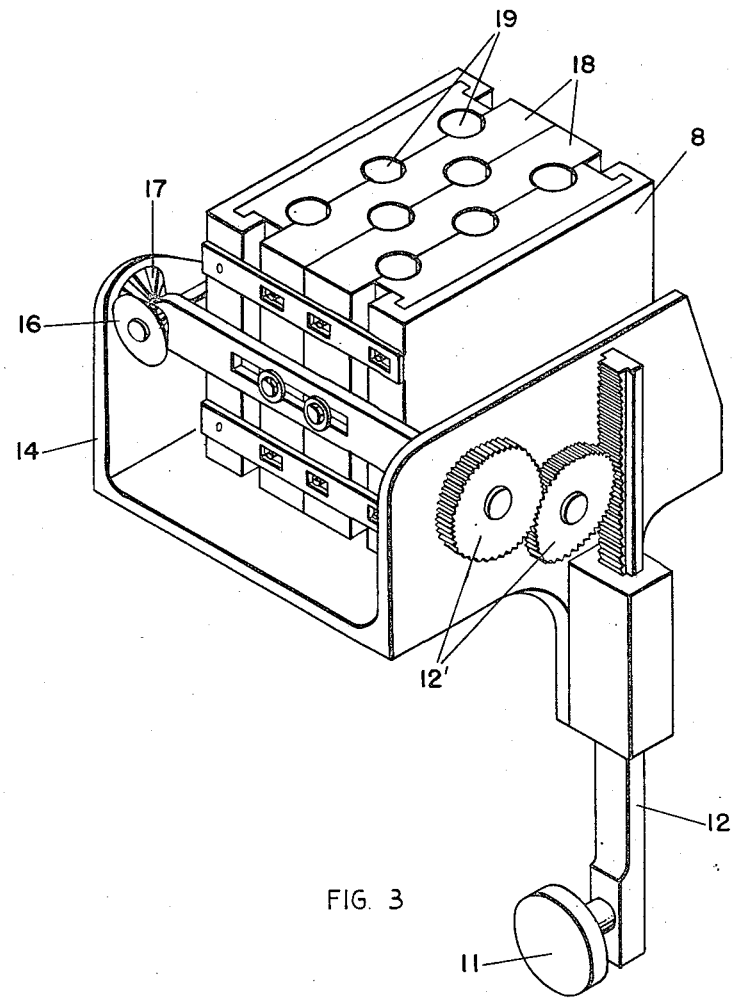
Figure 4:
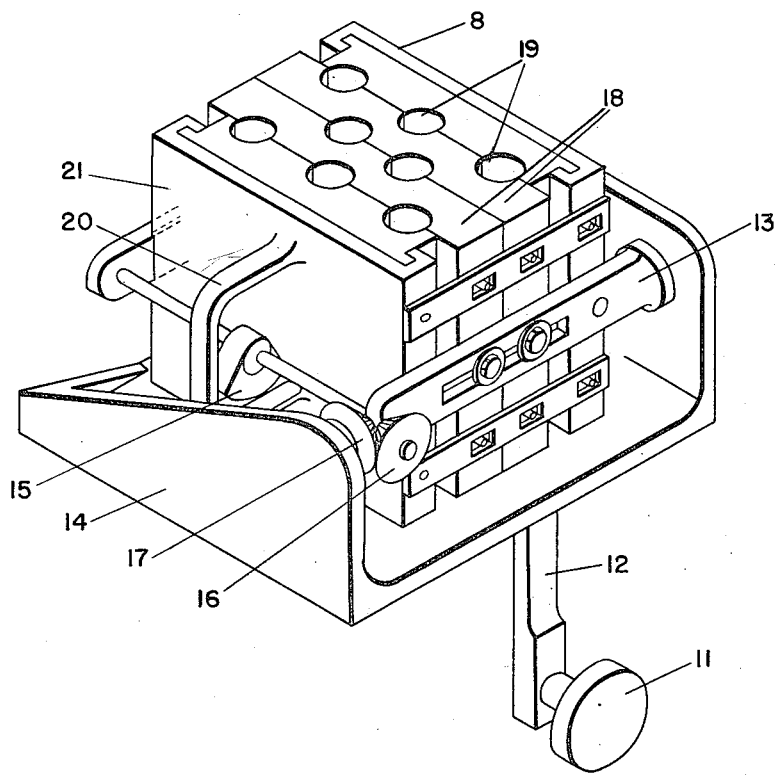
Figure 5:
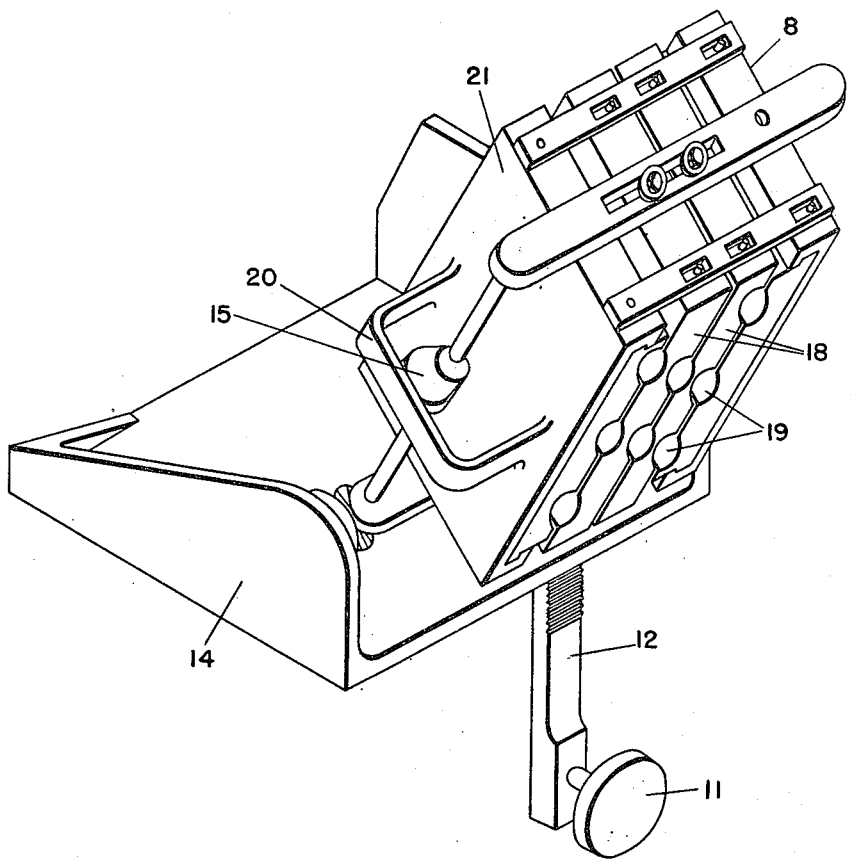

The invention is illustrated by way of example with reference to the receiving and eventually discharging of cylindrical wrappers for blasting explosives and to the diagrammatic drawings accompanying the specification whereof Fig. 1 is an isometric view in part section of an embodiment of apparatus according to the invention showing the cam-track in part section and wherein the rotatable table carries four symmetrically placed shuttles and wherein one shuttle is shown in the receiving position in alignment with the fixed spreader box, two shuttles are shown with their compartments vertical and with their closed ends below their open ends, and one shuttle is shown in the discharging position; Fig. 2 is an isometric view of the shuttle which is in the receiving position; Fig. 3 is an isometric view of either of the said shuttles which has its compartments vertical showing the shuttle-tilting mechanism; Fig. 4 is an isometric view of the shuttle illustrated in Fig. 3 showing the shuttle opening mechanism; Fig. 5 is an isometric view of the shuttle which is in the discharging position; Fig. 6 is an isometric view in part section of the fixed spreader box.

Referring to Figs. 1 to 6, 1 is a hopper containing cylindrical wrappers (not shown), 2 is a compartmented box below the hopper 1, 3 are pusher slats, 4 is a fixed spreader box having substantially horizontal passages 5, 6 is a rotatable table capable of intermittent rotation about its axle 7 and carrying four symmetrically placed compartmented shuttles 8. 9 is a fixed cylindrical structure having on its inner wall a cam-track 10 which imparts through the follower 11 vertical motion to the vertical rack 12 of the shuttle-tilting mechanism comprising the vertical rack 12 and the gear wheels 12'. The shuttle-tilting mechanism 12, 12', causes the shuttle 8 to rotate about a horizontal axle 13 mounted on a shuttle base 14, shown throughout as resting on the rotatable table 6. 15 is a cam which is rotated when the shuttle rotates about its horizontal axle 13 by a bevelled gear 16 engaging with a stationary bevelled gear 17 mounted coaxially with the horizontal axle 13 in the shuttle base 14. The rotation of the cam 15 causes the grooved shuttle leaves 18 of the shuttle 8 to be spaced out and brought together again so as to widen and bring back to normal the compartments 19 of the shuttle 8. 20 is a bracket in engagement with the cam 15 to move the movable portion 21 of the shuttle 8. The movement of the movable portion 21 causes in known manner the spacing out and bringing together the grooved shuttle leaves 18.

Referring specifically to Fig. 2 this shows that when the compartments 19 are in the horizontal position to receive the cylindrical wrappers the grooved shuttle leaves 18 have been spaced out to widen these compartments.

Referring specifically to Figs. 3 and 4 these show that when the compartments 19 are in the vertical position their grooved shuttle leaves 18 have been brought together.

Referring specifically to Fig. 5 this shows that when the shuttle 8 is in the discharging position the grooved shuttle leaves 18 are again spaced out.

The rotatable table 6 can be made to rotate by means of an intermittent drive so that each shuttle 8 stops in turn at each of the four fixed positions at 90° intervals on the fixed cylindrical structure 9.

In one of the two stationary positions following the stationary receiving position the cylindrical wrappers contained within the compartments 19 of a shuttle 8 can be filled with explosive composition and in the next stationary position the open ends of the cylindrical wrappers can be closed in known manner. The extrusion apparatus for the explosive composition and the closing mechanism for the filled cylindrical wrappers are not shown.

We claim:

1. Apparatus for receiving, successively positioning at intermediate locations, and subsequently discharging cylindrical wrappers comprising: a fixed spreader box having a plurality of substantially horizontal passages therethrough; a horizontal table adjacent said box mounted for intermittent rotation about a vertical axis; a plurality of shuttles mounted for rotation about individual horizontal axes on said table and equally spaced along the periphery thereof for successive alignment with said spreader box to receive cylindrical wrappers therefrom, each of said shuttles comprising separable laminated leaves grooved at their meeting faces to form therebetween a plurality of spaced compartments having one closed end and corresponding to the passages in said spreader box; means operable by rotational movements of each shuttle about its said horizontal axis for separating and contracting the leaves thereof to widen and narrow said compartments; and means operable by the rotational movement of said table and connected to each said shuttle for rotating the latter about its said horizontal axis to position said compartments horizontally for receiving the cylindrical wrappers when said shuttle is aligned with said spreader box, to position said compartments vertically with their open ends upwards and said leaves contracted for diverse operations on the wrappers at one or more intermediate locations of said shuttles, and to position said compartments in an inclined position with their open ends downward and said leaves separated for discharging the wrappers at a final location of said shuttles.

2. Apparatus as claimed in claim 1 in which the leaf separating and contracting means includes a cam for each shuttle box operable by the rotation of the latter about its horizontal axis to separate and contract the shuttle leaves.

3. Apparatus as claimed in claim 1 including a fixed circular cam track concentric with the table and means associated with each shuttle for converting linear motion into angular motion, the linear moving portion of said means having a follower engaging said cam track and the latter having a configuration to produce such linear motion of said follower as to effect the said positioning rotational movements of said shuttle about its horizontal axis as said table rotates.

DONALD G. ASHCROFT.
THOMAS PITCAIRN.

References Cited in the file of this patent

UNITED STATES PATENTS

| Number | Name | Date |
|---|---|---|
| 918,606 | Stillwell | Apr. 20, 1909 |
| 989,778 | Hammitt et al. | Apr. 18, 1911 |
| 995,045 | Talley | June 13, 1911 |
| 1,105,937 | Talley | Aug. 4, 1914 |
| 1,245,528 | Talley | Nov. 6, 1917 |